US012516635B2

(12) United States Patent
McQuiston et al.

(10) Patent No.: US 12,516,635 B2
(45) Date of Patent: Jan. 6, 2026

(54) COMPRESSOR STALL MITIGATION (71) Applicant: General Electric Company, Schenectady, NY (US)

(72) Inventors: Robert Jon McQuiston, Cincinnati, OH (US); Stefan Joseph Cafaro, Maineville, OH (US); Paul Robert Gemin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/150,563

(22) Filed: Jan. 15, 2021

(65) Prior Publication Data
US 2022/0065175 A1 Mar. 3, 2022

Related U.S. Application Data (60) Provisional application No. 63/072,573, filed on Aug. 31, 2020.

(51) Int. Cl.
*F02C 9/00* (2006.01)
*B64D 27/02* (2006.01)
(Continued)

(52) U.S. Cl.
CPC ............... *F02C 9/00* (2013.01); *B64D 27/10* (2013.01); *B64D 31/06* (2013.01); *F01D 15/10* (2013.01);
(Continued)

(58) Field of Classification Search
CPC .. F01D 15/10; F02C 6/20; F02C 6/206; F02C 9/00; F02C 9/28; F02C 3/04; F02C 7/00;
(Continued)

(56) References Cited

U.S. PATENT DOCUMENTS 3,750,782 A 8/1973 Costantini et al.
3,868,625 A * 2/1975 Speigner ............... F04D 27/001
340/626
(Continued)

FOREIGN PATENT DOCUMENTS

CN 104114874 A 10/2014
CN 103835881 B 9/2016
(Continued)

OTHER PUBLICATIONS

Weigl et al., Active Stabilization of Rotating Stall and Surge in a Transonic Single Stage Axial Compressor, 1997, ASME, 97-GT-411, All (Year: 1997).*

*Primary Examiner* — Jason H Duger
(74) *Attorney, Agent, or Firm* — Smith Gambrell & Russell LLP (57) ABSTRACT

A method for operating a hybrid-electric propulsion system of an aircraft, the hybrid-electric propulsion system comprising a gas turbine engine having a compressor and an electric machine coupled to the compressor, the method comprising: sensing data indicative of a pressure within the compressor of the gas turbine engine; determining conditions within the compressor are within a threshold of a stall limit for the compressor based at least in part on the sensed data indicative of the pressure within the compressor of the gas turbine engine; and modifying a torque of the compressor using the electric machine in response to determining the conditions within the compressor are within the threshold of the stall limit for the compressor to reduce a risk of compressor stall.

13 Claims, 5 Drawing Sheets

(51) Int. Cl.
| | | |
|---|---|---|
| *B64D 27/10* | (2006.01) | |
| *B64D 27/24* | (2024.01) | |
| *B64D 27/33* | (2024.01) | |
| *B64D 31/06* | (2024.01) | |
| *F01D 15/10* | (2006.01) | |
| *F02C 3/04* | (2006.01) | |
| *F02C 6/20* | (2006.01) | |
| *F02C 7/00* | (2006.01) | |
| *F02C 7/057* | (2006.01) | |
| *F02C 9/28* | (2006.01) | |
| *F02K 3/06* | (2006.01) | |
| *F04D 25/04* | (2006.01) | |
| *F04D 25/06* | (2006.01) | |
| *F04D 27/00* | (2006.01) | |
| *F04D 27/02* | (2006.01) | |
| *F02K 5/00* | (2006.01) | |

(52) U.S. Cl.
CPC ............... *F02C 3/04* (2013.01); *F02C 6/20* (2013.01); *F02C 7/00* (2013.01); *F02C 7/057* (2013.01); *F02C 9/28* (2013.01); *F02K 3/06* (2013.01); *F04D 25/04* (2013.01); *F04D 25/06* (2013.01); *F04D 27/001* (2013.01); *F04D 27/02* (2013.01); *F04D 27/0223* (2013.01); *F04D 27/0261* (2013.01); *B64D 27/026* (2024.01); *B64D 27/33* (2024.01); *F02K 5/00* (2013.01); *F05D 2220/323* (2013.01); *F05D 2270/052* (2013.01); *F05D 2270/101* (2013.01); *F05D 2270/301* (2013.01)

(58) Field of Classification Search
CPC ... F02C 7/057; F02K 3/06; F02K 5/00; F04D 25/06; F04D 27/0261; F04D 25/04; F04D 27/001; F04D 27/02; F04D 27/0223; F05D 2220/76; F05D 2270/101; F05D 2270/301; F05D 2270/303; F05D 2270/62; F05D 2270/052; B64D 27/10; B64D 27/24; B64D 27/026; B64D 27/33; B64D 2027/026; B64D 31/06
See application file for complete search history.

(56) References Cited

U.S. PATENT DOCUMENTS

| | | | |
|---|---|---|---|
| 5,594,665 A * | 1/1997 | Walter | F04D 27/001 |
| | | | 73/660 |
| 5,915,917 A * | 6/1999 | Eveker | F04D 27/02 |
| | | | 415/17 |
| 6,010,303 A | 1/2000 | Feulner | |
| 6,059,522 A | 5/2000 | Gertz et al. | |
| 6,098,010 A * | 8/2000 | Krener | F04D 27/001 |
| | | | 701/100 |
| 6,979,979 B2 | 12/2005 | Xu et al. | |
| 7,827,803 B1 * | 11/2010 | Wadia | F02C 7/057 |
| | | | 60/39.27 |
| 8,866,318 B2 | 10/2014 | Langford et al. | |
| 9,267,438 B2 | 2/2016 | Dooley et al. | |
| 9,428,267 B2 | 8/2016 | DeVita et al. | |
| 9,441,547 B2 | 9/2016 | Cai et al. | |
| 9,561,860 B2 | 2/2017 | Knapp et al. | |
| 9,630,510 B2 | 4/2017 | Sukumaran et al. | |
| 9,643,729 B2 | 5/2017 | Walter-Robinson | |
| 9,828,917 B2 | 11/2017 | Klonowski et al. | |
| 9,889,746 B2 | 2/2018 | Wolff et al. | |
| 10,023,319 B2 | 7/2018 | Teicholz et al. | |
| 10,260,471 B2 | 4/2019 | Huang | |
| 10,308,353 B2 | 6/2019 | Swann | |
| 10,392,119 B2 | 8/2019 | Niergarth et al. | |
| 10,435,165 B2 | 10/2019 | Swann et al. | |
| 10,436,059 B2 | 10/2019 | Liu et al. | |
| 10,442,547 B2 | 10/2019 | Miller et al. | |
| 10,450,886 B2 | 10/2019 | Sennoun | |
| 10,569,759 B2 | 2/2020 | Gansler et al. | |
| 10,644,630 B2 | 5/2020 | Smith et al. | |
| 10,676,199 B2 | 6/2020 | Hon et al. | |
| 10,711,693 B2 | 7/2020 | Miller et al. | |
| 10,724,442 B2 | 7/2020 | Betti et al. | |
| 10,737,798 B2 | 8/2020 | Misfeldt | |
| 11,149,648 B2 | 10/2021 | Husband et al. | |
| 11,539,316 B2 | 12/2022 | Gemin et al. | |
| 2003/0115883 A1 | 6/2003 | Myers, Jr. | |
| 2004/0216457 A1 | 11/2004 | Shea et al. | |
| 2005/0225303 A1 | 10/2005 | Xu et al. | |
| 2010/0138089 A1 | 6/2010 | James | |
| 2012/0167590 A1 | 7/2012 | Bettner | |
| 2013/0086919 A1 | 4/2013 | Dooley et al. | |
| 2013/0247579 A1 | 9/2013 | Morawski et al. | |
| 2014/0093350 A1 | 4/2014 | Meisner et al. | |
| 2015/0321752 A1 | 11/2015 | Trull et al. | |
| 2016/0053721 A1 | 2/2016 | Fletcher et al. | |
| 2016/0325826 A1 | 11/2016 | Swann | |
| 2017/0044989 A1 | 2/2017 | Gemin et al. | |
| 2017/0057650 A1 | 3/2017 | Walter-Robinson | |
| 2017/0175565 A1 | 6/2017 | Sennoun | |
| 2017/0175646 A1 | 6/2017 | Adibhatla | |
| 2017/0218854 A1 | 8/2017 | Nestico et al. | |
| 2017/0226933 A1 | 8/2017 | Klonowski et al. | |
| 2017/0226934 A1 | 8/2017 | Robic et al. | |
| 2017/0342855 A1 | 11/2017 | Hon et al. | |
| 2018/0065755 A1 | 3/2018 | Teicholz et al. | |
| 2018/0073437 A1 | 3/2018 | Simonetti et al. | |
| 2018/0128182 A1 | 5/2018 | Hayama et al. | |
| 2018/0141674 A1 | 5/2018 | Bailey et al. | |
| 2018/0194483 A1 | 7/2018 | Schwoller | |
| 2018/0319283 A1 | 11/2018 | Battin et al. | |
| 2018/0354631 A1 | 12/2018 | Adibhatla et al. | |
| 2018/0354632 A1 | 12/2018 | Hon et al. | |
| 2018/0370646 A1 | 12/2018 | Hon et al. | |
| 2019/0003398 A1 | 1/2019 | Gibson et al. | |
| 2019/0165708 A1 | 5/2019 | Smith et al. | |
| 2019/0186284 A1 | 6/2019 | Orkiszewski | |
| 2019/0345837 A1 | 11/2019 | Bacic | |
| 2019/0368500 A1 * | 12/2019 | Epstein | F04D 25/04 |
| 2020/0010205 A1 | 1/2020 | Swann et al. | |
| 2020/0056546 A1 | 2/2020 | Terwilliger et al. | |
| 2020/0056551 A1 | 2/2020 | Epstein | |
| 2020/0079513 A1 | 3/2020 | Pastouchenko et al. | |
| 2020/0095939 A1 | 3/2020 | Epstein | |
| 2020/0182158 A1 | 6/2020 | Kupratis | |
| 2020/0248619 A1 | 8/2020 | Romero et al. | |
| 2020/0284265 A1 | 9/2020 | Reepmeyer et al. | |
| 2021/0246837 A1 * | 8/2021 | Romero | F04D 19/026 |
| 2023/0126222 A1 | 4/2023 | Gemin et al. | |

FOREIGN PATENT DOCUMENTS

| | | | |
|---|---|---|---|
| CN | 106468219 A | 3/2017 | |
| CN | 108343513 A | 7/2018 | |
| CN | 111255572 A | 6/2020 | |
| EP | 2042743 A1 * | 4/2009 | ............ F04D 25/06 |
| EP | 3184756 A1 | 6/2017 | |
| EP | 3415436 A1 | 12/2018 | |
| EP | 3862569 A1 | 8/2021 | |
| JP | 5923515 B2 | 5/2016 | |
| WO | WO2002038963 A1 | 5/2002 | |
| WO | WO2008/049426 A1 | 5/2008 | |
| WO | WO2008/085535 A2 | 7/2008 | |
| WO | WO2014/085236 A1 | 6/2014 | |
| WO | WO2015/92269 A1 | 6/2015 | |

* cited by examiner

COMPRESSOR STALL MITIGATION

CROSS-REFERENCE TO RELATED APPLICATION

This application is a non-provisional application claiming the benefit of priority under 35 U.S.C. § 119(e) to U.S. Provisional Application No. 63/072,573, filed Aug. 31, 2020, which is hereby incorporated by reference in its entirety.

FIELD

The present subject matter relates generally to hybrid-electric power systems for aircraft and aircraft engines, and methods for operating the same to mitigate compressor stall.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing, separated from the wing and fuselage.

Hybrid electric propulsion systems are being developed to improve an efficiency of the conventional commercial aircraft. Various hybrid electric propulsion systems include an electric machine driven by one of the aircraft engines. The inventors of the present disclosure have come up with various configurations and/or methods to improve the currently-known hybrid electric propulsion systems, and in particular to systems and method to mitigate compressor stall in a hybrid electric propulsion system.

BRIEF DESCRIPTION

Aspects and advantages of the invention will be set forth in part in the following description, or may be obvious from the description, or may be learned through practice of the invention.

In one exemplary aspect of the present disclosure, a method for operating a hybrid-electric propulsion system of an aircraft is provided. The hybrid-electric propulsion system includes a gas turbine engine having a compressor and an electric machine coupled to the compressor. The method includes: sensing data indicative of a pressure within the compressor of the gas turbine engine; determining conditions within the compressor are within a threshold of a stall limit for the compressor based at least in part on the sensed data indicative of the pressure within the compressor of the gas turbine engine; and modifying a torque of the compressor using the electric machine in response to determining the conditions within the compressor are within the threshold of the stall limit for the compressor to reduce a risk of compressor stall.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In aeronautical gas turbine engines, the compressors are generally designed to operate within a conservative predetermined threshold of a compressor stall margin so as to reduce a risk of compressor stall under even the most harsh operating conditions, and assuming the engine has experience an expected amount of degradation (e.g., wearing out of seal, minor damage, etc.). Such may lead to the compressor, and engine as a whole, not being operated at or near its full potential.

With a hybrid electric aeronautical gas turbine engine, an electric machine may be coupled to the compressor, such as to a shaft rotatable with the compressor. The present disclosure utilizes the electric machine to facilitate operating the compressor closer to the compressor stall margin. More specifically, the present disclosure utilizes one or more sensors within the compressor section to sense data indicative of a stall condition within the compressor, or indicative of being within a threshold of a stall condition within the compressor. In response, power/torque may be added to the compressor with the electric machine to allow the compressor and engine to continue operating at the desired level or in the desired manner without stalling the compressor and without approaching the stall condition within the compressor.

In certain conditions, data may be sensed indicative of a compressor rotating stall condition using high frequency sensors. The electric machine may provide power to counter the compressor rotating stall condition and allow continued operation of the compressor at the desired levels without experiencing compressor rotating stall.

Figure 1:
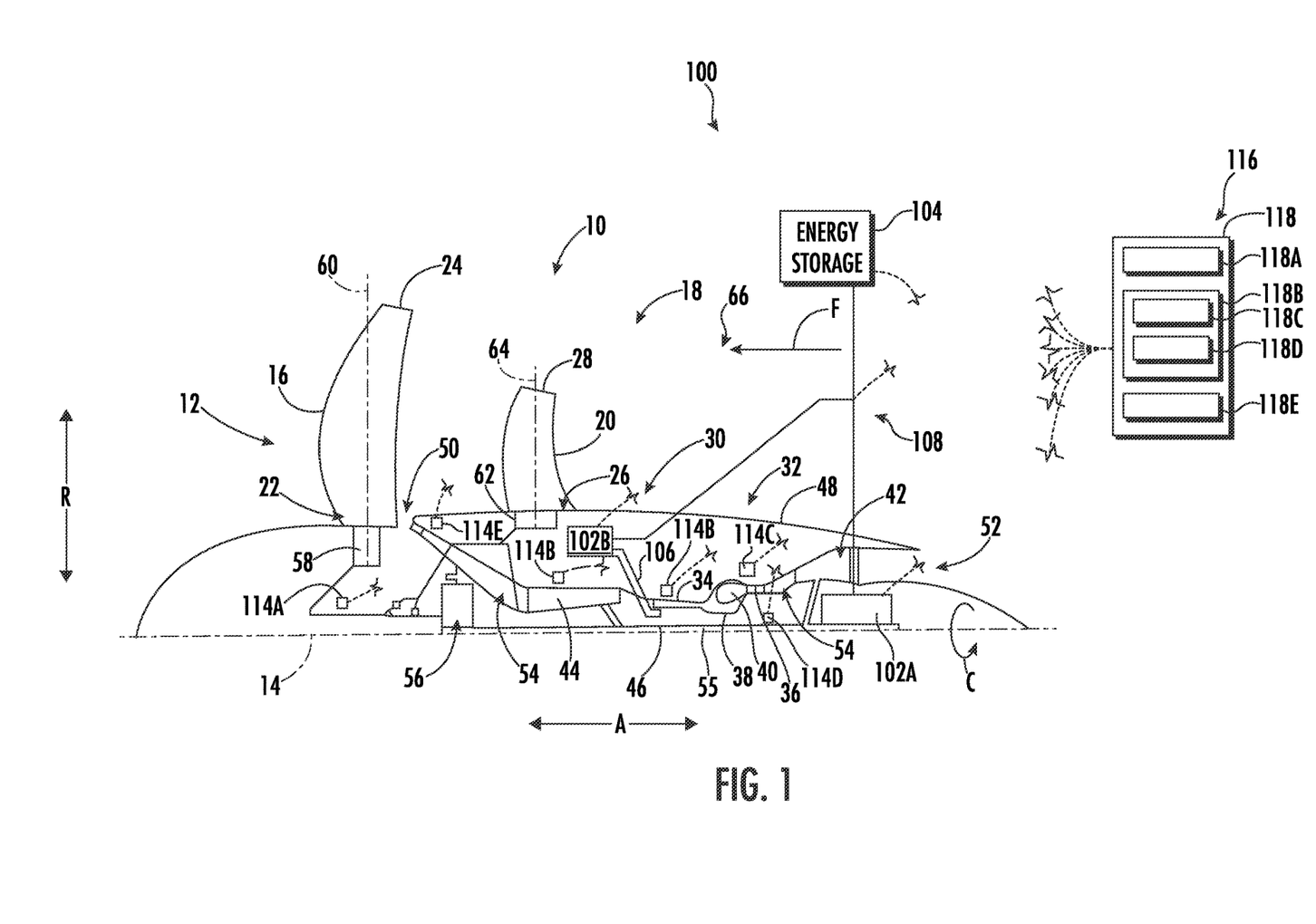
FIG. 1 is a schematic, cross-sectional view of a gas turbine engine in accordance with an exemplary embodiment of the present disclosure.

Referring now to FIG. 1, a cross-sectional view of an exemplary embodiment of a gas turbine engine as may incorporate one or more inventive aspects of the present disclosure is provided. In particular, the exemplary gas turbine engine of FIG. 1 is a configured as a single unducted rotor engine 10 defining an axial direction A, a radial direction R, and a circumferential direction C. As is seen from FIG. 1, the engine 10 takes the form of an open rotor propulsion system and has a rotor assembly 12 which includes an array of airfoils arranged around a central longitudinal axis 14 of engine 10, and more particularly includes an array of rotor blades 16 arranged around the central longitudinal axis 14 of engine 10.

Moreover, as will be explained in more detail below, the engine 10 additionally includes a non-rotating vane assembly 18 positioned aft of the rotor assembly 12 (i.e., non-rotating with respect to the central axis 14), which includes an array of airfoils also disposed around central axis 14, and more particularly includes an array of vanes 20 disposed around central axis 14.

The rotor blades 16 are arranged in typically equally spaced relation around the centerline 14, and each blade has a root 22 and a tip 24 and a span defined therebetween. Similarly, the vanes 20 are also arranged in typically equally spaced relation around the centerline 14, and each has a root 26 and a tip 28 and a span defined therebetween. The rotor assembly 12 further includes a hub 44 located forward of the plurality of rotor blades 16.

Additionally, the engine 10 includes a turbomachine 30 having a core (or high pressure/high speed system) 32 and a low pressure/low speed system. It will be appreciated that as used herein, the terms "speed" and "pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The core 32 generally includes a high-speed compressor 34, a high speed turbine 36, and a high speed shaft 38 extending therebetween and connecting the high speed compressor 34 and high speed turbine 36. The high speed compressor 34, the high speed turbine 36, and the high speed shaft 38 may collectively be referred to as a high speed spool of the engine. Further, a combustion section 40 is located between the high speed compressor 34 and high speed turbine 36. The combustion section 40 may include one or more configurations for receiving a mixture of fuel and air, and providing a flow of combustion gasses through the high speed turbine 36 for driving the high speed spool.

The low speed system similarly includes a low speed turbine 42, a low speed compressor or booster, 44, and a low speed shaft 46 extending between and connecting the low speed compressor 44 and low speed turbine 42. The low speed compressor 44, the low speed turbine 42, and the low speed shaft 46 may collectively be referred to as a low speed spool 55 of the engine.

Although the engine 10 is depicted with the low speed compressor 44 positioned forward of the high speed compressor 34, in certain embodiments the compressors 34, 44 may be in an interdigitated arrangement. Additionally, or alternatively, although the engine 10 is depicted with the high speed turbine 36 positioned forward of the low speed turbine 42, in certain embodiments the turbines 36, 42 may similarly be in an interdigitated arrangement.

Referring still to FIG. 1, the turbomachine 30 is generally encased in a cowl 48. Moreover, it will be appreciated that the cowl 48 defines at least in part an inlet 50 and an exhaust 52, and includes a turbomachinery flowpath 54 extending between the inlet 50 and the exhaust 52. The inlet 50 is for the embodiment shown an annular or axisymmetric 360 degree inlet 50 located between the rotor blade assembly 12 and the fixed or stationary vane assembly 18, and provides a path for incoming atmospheric air to enter the turbomachinery flowpath 54 (and compressors 44, 34, combustion section 40, and turbines 36, 42) inwardly of the guide vanes 28 along the radial direction R. Such a location may be advantageous for a variety of reasons, including management of icing performance as well as protecting the inlet 50 from various objects and materials as may be encountered in operation.

However, in other embodiments, the inlet 50 may be positioned at any other suitable location, e.g., aft of the vane assembly 18, arranged in a non-axisymmetric manner, etc.

As is depicted, the rotor assembly 12 is driven by the turbomachine 30, and more specifically, is driven by the low speed spool 55. More specifically, still, engine 10 in the embodiment shown in FIG. 1 includes a power gearbox 56, and the rotor assembly 12 is driven by the low speed spool 55 of the turbomachine 30 across the power gearbox 56. In such a manner, the rotating rotor blades 16 of the rotor assembly 12 may rotate around the axis 14 and generate thrust to propel engine 10, and hence an aircraft to which it is associated, in a forward direction F.

The power gearbox 56 may include a gearset for decreasing a rotational speed of the low speed spool 55 relative to the low speed turbine 42, such that the rotor assembly 12 may rotate at a slower rotational speed than the low speed spool 55.

As briefly mentioned above the engine 10 includes a vane assembly 18. The vane assembly 18 extends from the cowl 48 and is positioned aft of the rotor assembly 12. The vanes 20 of the vane assembly 18 may be mounted to a stationary frame or other mounting structure and do not rotate relative to the central axis 14. For reference purposes, FIG. 1 also depicts the forward direction with arrow F, which in turn defines the forward and aft portions of the system. As shown in FIG. 1, the rotor assembly 12 is located forward of the turbomachine 30 in a "puller" configuration, and the exhaust 52 is located aft of the guide vanes 28. As will be appreciated, the vanes 20 of the vane assembly 18 may be configured for straightening out an airflow (e.g., reducing a swirl in the airflow) from the rotor assembly 12 to increase an efficiency of the engine 10. For example, the vanes 20 may be sized, shaped, and configured to impart a counteracting swirl to the airflow from the rotor blades 16 so that in a downstream direction aft of both rows of airfoils (e.g., blades 16, vanes 20) the airflow has a greatly reduced degree of swirl, which may translate to an increased level of induced efficiency.

Referring still to FIG. 1, it may be desirable that the rotor blades 16, the vanes 20, or both, incorporate a pitch change mechanism such that the airfoils (e.g., blades 16, vanes 20, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the rotor blades 16, or to provide a thrust reversing feature which may be useful in certain operating conditions such as upon landing an aircraft, or to desirably adjust acoustic noise produced at least in part by the rotor blades 16, the vanes 20, or aerodynamic interactions from the rotor blades 16 relative to the vanes 20. More specifically, for the embodiment of FIG. 1, the rotor assembly 12 is depicted with a pitch change mechanism 58 for rotating the rotor blades 16 about their respective pitch axes 60, and the vane assembly 18 is depicted with a pitch change mechanism 62 for rotating the vanes 20 about their respective pitch axes 64.

It will be appreciated, however, that the exemplary single rotor unducted engine 10 depicted in FIG. 1 is by way of example only, and that in other exemplary embodiments, the engine 10 may have any other suitable configuration, including, for example, any other suitable number of shafts or spools, turbines, compressors, etc.; fixed-pitch blades 16, 20, or both; a direct-drive configuration (i.e., may not include the gearbox 56); etc. For example, in other exemplary embodiments, the engine 10 may be a three-spool engine, having an intermediate speed compressor and/or turbine. In such a configuration, it will be appreciated that the terms "high" and "low," as used herein with respect to the speed and/or pressure of a turbine, compressor, or spool are terms of convenience to differentiate between the components, but do not require any specific relative speeds and/or pressures, and are not exclusive of additional compressors, turbines, and/or spools or shafts.

Additionally, or alternatively, in other exemplary embodiments, any other suitable gas turbine engine may be provided. For example, in other exemplary embodiments, the gas turbine engine may be a turboshaft engine, a turboprop engine, turbojet engine, etc. Moreover, for example, although the engine is depicted as a single unducted rotor engine, in other embodiments, the engine may include a multi-stage open rotor configuration, and aspects of the disclosure described hereinbelow may be incorporated therein.

Further, still, in other exemplary embodiments, the engine 10 may be configured as a ducted turbofan engine. For example, referring briefly to FIG. 2, an engine 10 in accordance with another exemplary embodiment of the present disclosure is depicted. The exemplary embodiment of FIG. 2 may be configured in substantially the same manner as the exemplary engine 10 described above with respect to FIG. 1, and the same or similar reference numerals may refer to the same or similar parts. However, as will be appreciated, for the embodiment shown, the engine 10 further includes a nacelle 80 circumferentially surrounding at least in part the rotor assembly 12 and turbomachine 30, defining a bypass passage 82 therebetween.

Referring now back to FIG. 1, it will be appreciated that the engine is integrated with an electric power system 100. The electric power system 100 generally includes an electric machine 102 coupled to at least one of the high pressure system (or core 32) or the low pressure system, and an energy storage unit 104

Further, for the embodiment shown, the electric machine 102 of the electric power system 100 is an LP electric machine 102A coupled to the low pressure system of the engine. More specifically, for the embodiment shown, the LP electric machine 102A is embedded within the engine 10, at a location within or aft of the turbine section of the engine 10, and inward of the core airflow path 54 through the engine 10 along the radial direction R. It will be appreciated, however, that in other example embodiments, the LP electric machine 102A may additionally, or alternatively, be configured in the other suitable manner. For example, in other embodiments, the LP electric machine 102A may be embedded within a compressor section of the engine 10, may be located outward of core airflow path 54 along the radial direction R (and, e.g., within the cowl 48), etc.

Moreover, for the embodiment shown, the LP electric machine 102A is not the only electric machine 102 of the electric power system 100 integrated with the engine 10. More specifically, the electric power system 100 further includes an HP electric machine 102B coupled to the high-pressure system/core of the engine 10, and in electrical communication with the electric power bus 108. The HP electric machine 102B is, for the embodiment shown, also embedded within the engine 10 at a location inward of the core airflow path 54. However, for the embodiment shown, the HP electric machine 102B is located within the compressor section of the engine 10. It will be appreciated that in other embodiments, the HP electric machine 102B may alternatively be positioned outward of the core airflow path 54 along the radial direction R, driven through, e.g., a geared connection. For example, in certain embodiments, the HP electric machine 102B may be coupled to an accessory gearbox (not shown), which is in turn coupled to the high-pressure system of the engine 10.

In at least certain exemplary embodiments, the energy storage unit 104 may include one or more batteries. Additionally, or alternatively, the energy storage unit 104 may include one or more supercapacitor arrays, one or more ultracapacitor arrays, or both. In at least certain embodiments, the energy storage unit 104 may be configured to provide at least 5 kilowatts (kW) of energy to the electric power system 100, such as at least 50 kW, such as at least 50 kW, such as at least 250 kW, such as at least 300 kW, such as at least 350 kW, such as at least 400 kW, such as at least 500 kW, such as up to 5 megawatts (MVV), such as up to 10 megawatts (MVV). Further, the energy storage unit 104 may be configured to provide such electrical power for at least two minutes, such as at least three minutes, such as at least five minutes, such as up to an hour. Further, still, in other embodiments, the energy storage unit 104 may be configured to provide such electrical power for any other suitable duration.

Moreover, for the embodiment shown, the electric power system 100 includes an electric power bus 108 electrically connecting the various components of electric power system 100. The electric power bus 108 may be, e.g., one or more electrical lines arranged in any suitable configuration.

Referring still to the exemplary embodiment of FIG. 1, although not depicted, it will be appreciated that the exemplary electric power system may also include an auxiliary power unit. The auxiliary power unit, if included, may include a combustion engine driving an electric generator, and may be located remotely from the engine 10. For example, in at least certain exemplary embodiments, the auxiliary power unit, if provided, may be located within a fuselage of the aircraft utilizing the engine 10, e.g., at an aft end of the aircraft, and electrically coupled to the electric power bus 108.

Referring still to FIG. 1, the exemplary electric power system 100 is operably connected to a controller 116. The controller 116 may be an engine controller for the engine 10 (e.g., a Full Authority Digital Engine Control controller), may be an aircraft controller, may be a controller dedicated to the electric power system 100, etc.

The controller 116 may be configured to receive data indicative of various operating conditions and parameters of the engine 10 during operation of the engine 10. For example, the engine 10 includes one or more sensors 114 configured to sense data indicative of various operating conditions and parameters of the engine 10, such as rotational speeds, temperatures, pressures, vibrations, etc. More specifically, however, for the exemplary embodiment depicted in FIG. 1, the one or more sensors 114 includes a first speed sensor 114A configured to sense data indicative of one or more parameters of the rotor assembly 12 (e.g., rotational speed, acceleration, torque on the rotor shaft driving the rotor assembly 12, etc.); a second sensor 114B configured to sense data indicative of the compressors (such as a pressure within the high pressure compressor 34, a pressure within the low pressure compressor 44, etc.); a third sensor 114C configured to sense data indicative of one or combustion section parameters (such as a temperature within the combustion section 40, a fuel flow to the combustion section 40, one or more pressures within or around the combustion section 40, etc.), one or more high pressure turbine parameters (such as turbine inlet temperature, a rotational speed of the high pressure turbine 36, etc.), or both; a fourth sensor 114D operable to sense data indicative of one or more parameters of the low pressure system (such as a rotational speed of the low pressure spool 55); and a fifth sensor 114E configured to sense data indicative of one or more variable geometry components (such as a position of one or more variable inlet guide vanes, outlet guide vanes, rotor blades 16, guide vanes 20, etc.).

Referring particularly to the operation of the controller 116, in at least certain embodiments, the controller 116 can include one or more computing device(s) 118. The computing device(s) 118 can include one or more processor(s) 118A and one or more memory device(s) 118B. The one or more processor(s) 118A can include any suitable processing device, such as a microprocessor, microcontroller, integrated circuit, logic device, and/or other suitable processing device. The one or more memory device(s) 118B can include one or more computer-readable media, including, but not limited to, non-transitory computer-readable media, RAM, ROM, hard drives, flash drives, and/or other memory devices.

The one or more memory device(s) 118B can store information accessible by the one or more processor(s) 118A, including computer-readable instructions 118C that can be executed by the one or more processor(s) 118A. The instructions 118C can be any set of instructions that when executed by the one or more processor(s) 118A, cause the one or more processor(s) 118A to perform operations. In some embodiments, the instructions 118C can be executed by the one or more processor(s) 118A to cause the one or more processor(s) 118A to perform operations, such as any of the operations and functions for which the controller 116 and/or the computing device(s) 118 are configured, the operations for operating an electric power system 100 (e.g., method 300), as described herein, and/or any other operations or functions of the one or more computing device(s) 118. The instructions 118C can be software written in any suitable programming language or can be implemented in hardware. Additionally, and/or alternatively, the instructions 118C can be executed in logically and/or virtually separate threads on processor(s) 118A. The memory device(s) 118B can further store data 118D that can be accessed by the processor(s) 118A. For example, the data 118D can include data indicative of power flows, data indicative of engine 10/aircraft operating conditions, and/or any other data and/or information described herein.

The computing device(s) 118 can also include a network interface 118E used to communicate, for example, with the other components of the engine 10, the aircraft incorporating the engine 10, the electric power system 100, etc. For example, in the embodiment depicted, as noted above, the engine 10 includes one or more sensors 114 for sensing data indicative of one or more parameters of the engine 10 and various accessory systems, and the electric power system 100 includes an energy storage unit 104, an LP electric machine 102A, an HP electric machine 102B, and an auxiliary power unit. The controller 116 is operably coupled to these components through, e.g., the network interface 118E, such that the controller 116 may receive data indicative of various operating parameters sensed by the one or more sensors 114 during operation, various operating conditions of the components, etc., and further may provide commands to control electrical flow of the electric power system 100 and other operating parameters of these systems, e.g., in response to the data sensed by the one or more sensors 114 and other conditions.

The network interface 118E can include any suitable components for interfacing with one or more network(s), including for example, transmitters, receivers, ports, controllers, antennas, and/or other suitable components. For example, in the embodiment shown, the network interface 118E is configured as a wireless communication network wirelessly in communication with these components (as is indicated by the dashed communication lines in FIG. 1).

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 2:
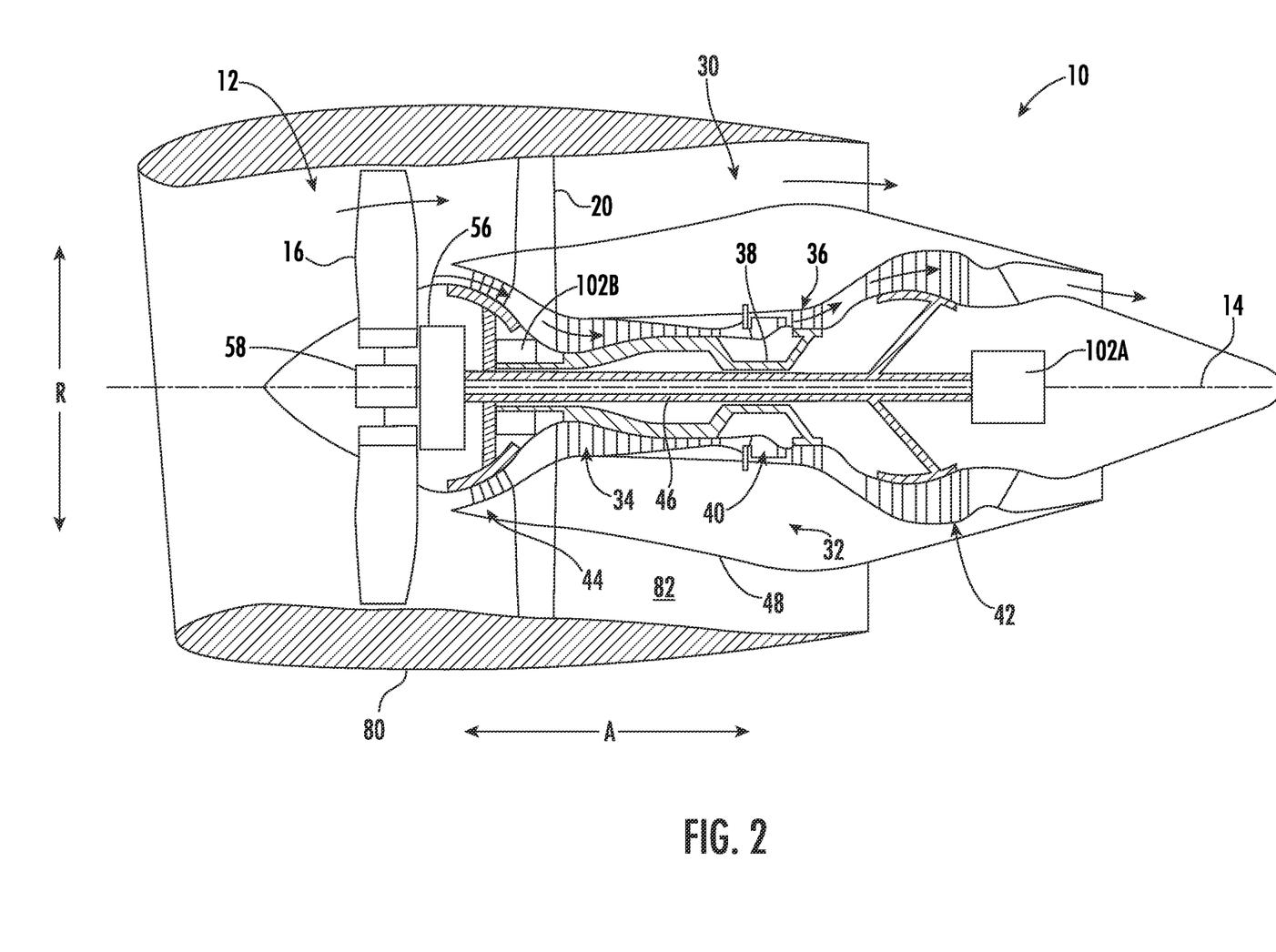
FIG. 2 is a schematic, cross-sectional view of a gas turbine engine in accordance with another exemplary embodiment of the present disclosure.
Figure 3:
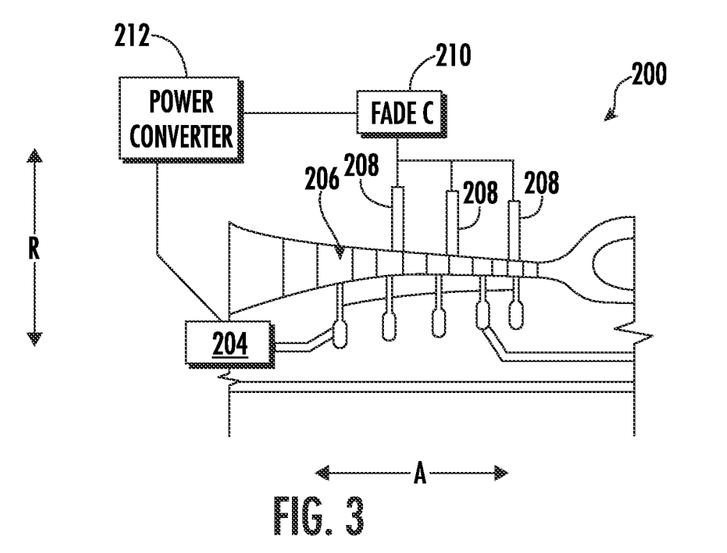
FIG. 3 is a schematic, cross-sectional view of a compressor of a gas turbine engine in accordance with an exemplary aspect of the present disclosure.

Referring now to FIG. 3, a close-up view of a compressor 202 of a gas turbine engine 200 including an electric machine 204 is depicted. The compressor 202 may be a high pressure compressor, such as high pressure compressor 34 of FIGS. 1 and 2, and in such a manner, it will be appreciated that the gas turbine engine 200 may be configured in a similar manner as the exemplary gas turbine engines 10 described above with reference to, e.g., FIGS. 1 and 2.

Notably, however, in other embodiments, the systems and methods of the present disclosure may be applied to a low pressure compressor, such as the exemplary low pressure compressor 44 described above with reference to FIGS. 1 and 2. Additionally, or alternatively, still, in other exemplary embodiments, the systems and methods of the present disclosure may be applied to a fan, such as a ducted fan, such as the ducted fan depicted in FIG. 2. In these alternative embodiments, the sensors discussed below may be arranged outward of the low pressure compressor rotor blades or the fan blades, respectively.

Referring still to FIG. 3, the gas turbine engine 200 further includes an electric machine 204 coupled to the compressor 202, and the electric machine 204 may be configured similarly to the exemplary electric machine 102B of FIGS. 1 and 2. Alternatively, however, it may be configured in any other suitable manner. For example, for the embodiment shown, the electric machine 204 is embedded within the engine 200 (e.g., positioned inward of a core air flowpath 206 along a radial direction R). However, in other embodiments, the electric machine 204 may be coupled to the compressor 202 through an offset connection (e.g., through a gear train extending through the core air flowpath 206; see FIG. 1). The electric machine 204 may be configured to add power to the compressor 202 by way of a shaft rotatable with the compressor 202 and/or extract power from the compressor 202 through the shaft rotatable with the compressor 202.

For the embodiment shown, the compressor 202 further includes a plurality of sensors 208 configured to sense data at a high frequency that is indicative of a pressure within the compressor 202 and more specifically at one or more locations within the compressor 202, such as at one or more locations within the core air flowpath 206 of the compressor 202 along an axial direction A of the engine 200.

Figure 4:
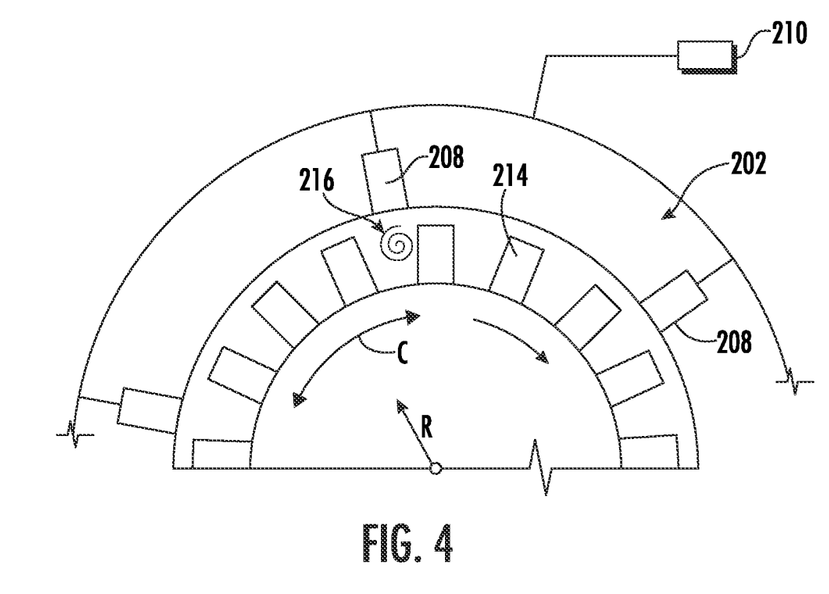
FIG. 4 is a schematic view of a stage of a compressor of a gas turbine engine in accordance with an exemplary aspect of the present disclosure.

Additionally, or alternatively, referring now also to FIG. 4, providing a schematic view of a stage of compressor rotor blades 214 of the compressor 202 along the axial direction A, it will be appreciated that in certain exemplary embodiments, the plurality of sensors 208 may be configured to sense data at a plurality of locations within the core air flowpath 206 of the compressor 202 along a circumferential direction C of the engine 200. Further, as will be appreciated, the sensors 208 may be positioned over the blades 214, such as over the tips of the blades, and aligned with the blades along the axial direction A (each within a reference plane defined by the axial and radial directions A, R). In either configuration, the sensors 208 may be operable to sense data indicative of pressure fluctuations caused by blade tip vortices 216 at the compressor element. For example, when the rotor blades 216 are rotated in a first circumferential direction Cl, the vortices 216 may form behind one or more of the rotor blades 216, causing pressure fluctuations.

The frequency at which the sensor reads the operating characteristic associated with the compressor element (e.g., the pressure fluctuations at the compressor element) can be on the order of two thousand (2,000) times per second, or approximately equal to the update rate of the one or more computing devices 210 (described below). In such a manner, it will be appreciated that, for example, in certain exemplary aspects, the term "high frequency" refers to a frequency of at least 500 hertz, such as at least 1,000 hertz, such as at least 1,500 hertz, and up to 10,000 hertz, such that a sensing loop closure would occur at least every millisecond.

In certain exemplary embodiments, the sensors 208 may be part of a compressor active stability management (CASM) system designed to protect the engine from compressor stall. For instance, CASM system may receive data from sensors 208 and interpret the data in some way to represent impending stall or stall margin remaining.

Referring back specifically to FIG. 3, the sensors 208 are further configured to transmit such information to an engine controller 210 (such as a FADEC). The engine controller 210 may be configured in a similar manner as the controller 116 described above with respect to FIG. 1. In such a manner, it will be appreciated that the controller 210 is in operable communication with the electric machine 204 such that the engine controller 210 can provide instructions configured to modulate a power being extracted from the compressor 202 through the electric machine 204 and/or a power being added to the compressor 202 through the electric machine 204.

Notably, for the embodiment shown, the controller 210 is in communication with the electric machine 204 through a power converter 112, which may include any suitable power electronics, converters, etc. The system described herein may provide power to the electric machine through the connection with the engine controller 210, or alternatively, the engine controller 210 may instead control operation of the power converter 112 (which is in electrical communication with a separate power source, such as a separate electric machine, an energy storage unit, an auxiliary power unit, etc.), which in turn allow for the engine controller 210 to control operation of the electric machine 204.

In such a manner, the system may determine a risk of stall within the compressor 202. More specifically, using the high frequency sensed data indicative of a pressure within the compressor 202 at the specific locations within the compressor 202, the system may determine how close the compressor 202 is to a stall threshold, such as a rotating stall threshold. As will be appreciated, the term "rotating stall" generally refers to a local disruption of airflow within the compressor 202 which continues to provide compressed air, but with reduced effectiveness. Rotating stall may arise when a small proportion of airfoils experience airfoil stall, disrupting the local airflow without destabilizing the compressor 202. The stalled airfoils may create pockets of relatively stagnant air which, rather than moving in the flow direction, rotate in a circumferential direction C of the compressor 202. In certain exemplary embodiments, there may only be one "stalled" airfoil, but the rotating stall may grow from there, propagating to a plurality of airfoils, creating a surge of stalled airfoils and a more pronounced compressor stall.

In order to combat this rotating stall, the system may modify a toque on the compressor 202 (e.g., a torque on a shaft or spool drivingly coupled to the compressor 202) to avoid the stall condition, or rather avoid or reduce the rotating stall condition. For example, in response to sensing data indicative of conditions within a predetermined range of a compressor rotating stall threshold, the system may modify a torque on the compressor 202 using the electric machine 204. For example, in response to sensing data indicative of conditions within a predetermined range of a compressor rotating stall threshold, the system may add torque to the compressor 202 using the electric machine 204.

The system may continue high frequency sensing of the data indicative of pressure within the compressor 202 at the specific locations within the compressor 202 while modifying the torque on the compressor 202 and increase or decrease the amount of torque added or extracted from the compressor 202 in response to the sensed data. In such a manner, a control of the system may be referred to as a feedback control loop control. Further, the amount of torque modification may be proportional to the value of sensed data and how close the sensed data indicates the compressor 202 is to a rotating stall condition.

For example, in certain exemplary aspects, the system may continue high frequency sensing of the data indicative of pressure within the compressor 202 at the same locations (e.g., at the same stage of compressor rotor blades 214) while modifying the torque so as to ensure the specific compressor rotating stall is mitigated.

Additionally, or alternatively, it other exemplary aspects, the system may continue high frequency sensing of the data indicative of pressure within the compressor 202 at other locations (e.g., at an upstream or downstream stage of compressor rotor blades 214) while modifying the torque so as to ensure the compressor rotating stall does not travel forward or aft. For example, in certain engine configurations, the location with the highest probability of experiencing a compressor rotating stall moves forward or aft based on the overall pressure ratio (OPR) of the compressor. For example, as the OPR increases, the location with the highest probability of experiencing a compressor rotating may move forward, and as the OPR decreases, the location with the highest probability of experiencing a compressor rotating may move aft. Or, the location with the highest probability of experiencing a compressor rotating may move in the opposite direction based on the OPR.

More specifically, it will be appreciated that over the course of a transient condition (e.g., an acceleration), a critical stage of the compressor 202 for stall may shift from a forward end of the compressor 202 towards a back end of the compressor 202. Therefore, the system may monitor the multiple sensors 208 (e.g., CASM system sensors) simultaneously and control torque input and frequency to manage the limiting stage of the compressor 202 at any particular time. In such a manner, it will be appreciated that the system may select a torque profile (amount, frequency, etc.) to match the location of the limiting stage of the compressor 202 to combat any rotating stall that may occur at such stage.

It will also be appreciated that a rotating stall may present pressure fluctuations defining a sinusoidal pattern. In such a manner, the system may sense data indicative of the pressure fluctuations, including a pattern of the pressure fluctuations, at a location within the compressor 202 with the sensors 208 and may apply a torque with the electric machine 204 at a frequency and magnitude configured to oppose the pattern of the pressure (e.g., in a sinusoidal pattern 180 degrees out of phase with the pattern of the pressure fluctuations, or more generally varying the phase, frequency and/or magnitude of the torque variation to lower the amplitude of pressure variation using a feedback loop). The pressure may be a pressure above a threshold indicative of a potential rotating stall.

Figure 6:
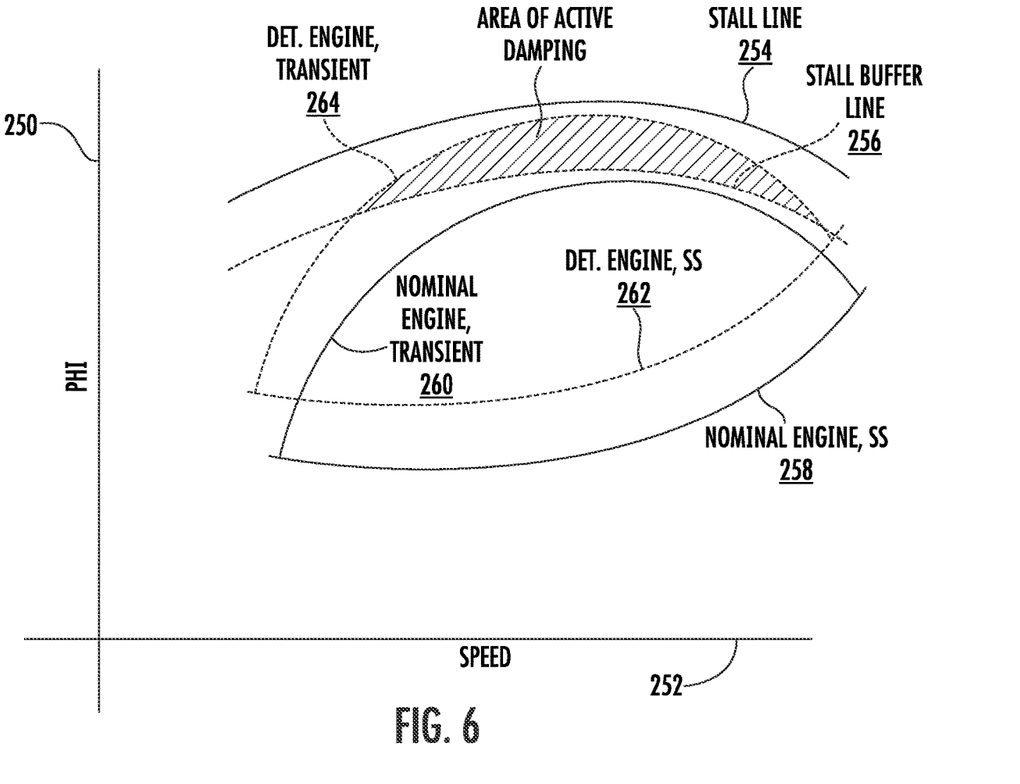
FIG. 6 is a graph depicting operating lines and stall lines of engines in accordance with an exemplary aspect of the present disclosure.

It will further be appreciated from the foregoing that utilization of an electric power source to modulate the radial speed according to a harmonic profile based on the sensed harmonic profile of pressure variation in the sensors 208 in this manner serves to reduce the instances of boundary layer separation and un-separation producing the sensed pressure variation, hence regaining or increasing the margin between the transient operating line 164 and stall line 254 (see FIG. 6).

With such a system, the engine may run closer to stall margin limits, particularly during transients, allowing for quicker accelerations, smaller core engines, and overall higher performance, as the system described herein may prevent or minimize the stall conditions by adding power in response to data indicating the engine (or more particularly the compressor 202) is approaching a stall condition. Further, with such a system, the engine 200 may be designed to run more optimally using different bleed valve controls (e.g., run the bleed valves more closed), different variable inlet guide vane schedules, etc., and utilize the present disclosure to mitigate any conditions approaching compressor stall.

Figure 5:
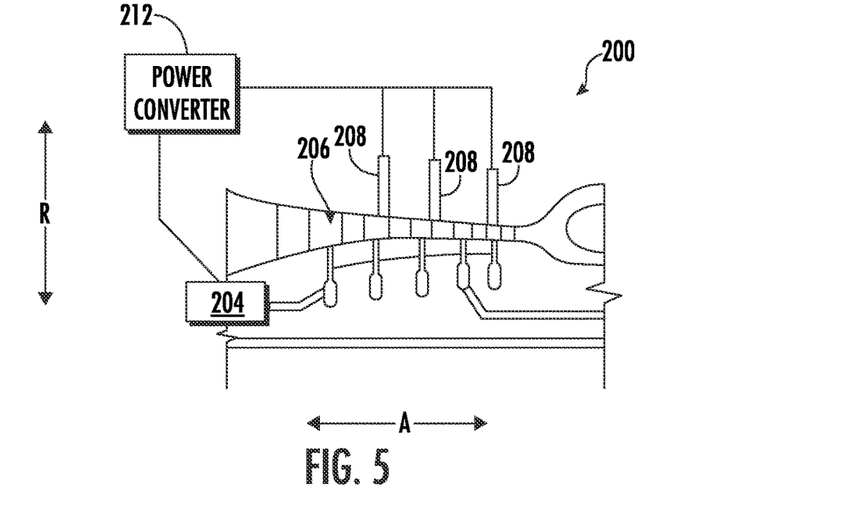
FIG. 5 is a schematic, cross-sectional view of a compressor of a gas turbine engine in accordance with another exemplary aspect of the present disclosure.

It will be appreciated that the system depicted in FIG. 3 is by way of example only and that in other embodiments, any other suitable configuration may be provided. For example, as shown in FIG. 5, the system may not include or utilize the engine controller 210, and instead may use, e.g., higher frequency power electronics within the power converter 112 to control the modification of torque on the compressor 202.

As mentioned above, the system may sense data indicative of the compressor stall at a high frequency. In the embodiment of FIG. 3, the response time of the electric machine 204 is limited by the refresh rate of the computing device 210. In the embodiment of FIG. 5, the electric machine 204 may respond more quickly to the high frequency data sensed by the sensors 208 by bypassing the engine controller 210, providing for a quicker response time for the system. For example, in one or more of these embodiments, the system may modify the torque on the compressor 202 using the electric machine 204 within one (1) second of sensing data indicative of the compressor being within a threshold of compressor stall, such as within 0.5 seconds, such as within 0.1 seconds, such as within 0.01 seconds, such as within 0.001 seconds, such as within 0.0005 seconds.

Moreover, it will be appreciated that although for the embodiment shown a plurality of high frequency sensors are used to sense pressure data to determine the stall condition (or proximity to the stall condition), in other exemplary aspects, the system may additionally or alternatively use other gas turbine engine parameters, such data from other sensors indicative of a rotational speed of one or more components of the engine (e.g., the compressor), a temperature within the engine (e.g., a compressor exit temperature), a torque on one or more components of the engine (e.g., the compressor), etc. Further, although for the exemplary embodiment depicted, the torsional response is provided by the electric machine 204, in other exemplary embodiments, the torsional response from the electric machine may be in combination without actions, such as modification of one or more variable geometry components (e.g., variable guide vanes), fuel flow, etc.

Referring now to FIG. 6, provided is a graph depicting application of the above system. The graph plots on the "y-axis" 250 the variable Phi (indicative of a stall line of the engine 200) vs. compressor rotational speed ("x-axis" 252). As will be appreciated, a new engine, with minimal deterioration, will be capable of performing transit operations, such as accelerations, better than more deteriorated engines. As used herein, "deterioration" refers to e.g., actual engine deteriorations (e.g., worn-down seals, nicks and minor deformations in the airfoils, etc.), power extractions (e.g., pulling power off of an engine shaft using an electric machine), harsh ambient conditions, etc.

It will be appreciated that in at least certain exemplary embodiments, the variable Phi may refer to a calculation of fuel-to-air ratio (FAR) divided by the stoichiometric fuel-to-air ratio (FARst). Alternatively, Phi may be used to describe a parameter which trends with FAR/FARst. Corrected Phi adjusts for temperature effects on the compressor airflow.

Depicted in FIG. 6 is a stall line 254 for the exemplary engine 200 of FIG. 3, as well as a stall buffer line 256 (or nominal topping for the stall line). Generally, engines are designed such that during all operating modes, throughout the life of the engine, the engine operates below the stall buffer line 256. Such a configuration requires engines that otherwise would be able to be operated for higher performance (e.g., operated at higher rotational speeds, higher pressures, etc.), must be throttled back to accommodate the anticipated extreme operating conditions of the relatively deteriorated version of itself.

However, inclusion of a system described above with reference to FIGS. 3 through 5 may allow for a newer engine to be set to operate closer to the stall buffer line 256. Such a benefit will be explained in more detail below.

Referring still to FIG. 6, FIG. 6 further depicts operation lines of a nominal engine in a steady-state (line 258) and in a transient state (line 260), which for the embodiment shows is an acceleration state of the engine 200. In addition, FIG. 6 shows operational lines for an older, more deteriorated engine in a steady state (line 262) and in a transient state (line 264), which again for the embodiment shown is an acceleration state of the older, more deteriorated engine.

As shown, while the new engine is able to operate in the transient state without exceeding the stall buffer line 256, the older, more deteriorated engine exceeds the stall buffer line 256 during the same transient state. However, utilizing the system described above with reverence to, e.g., FIGS. 3 through 5, the older, more deteriorated engine may operate in this transient state without a significant risk of stall due to the stall damping provided. For example, when the older, more deteriorated engine begins operating above the stall buffer line 256, the high-frequency sensors 208 sensing data indicative of pressure within the compressor 202 may indicate operation within a predefined threshold of compressor stall, such as compressor rotating stall, which may be operation above the stall buffer line 256. In response, the system may modify torque on the compressor 202 using the electric machine 204 such that the compressor 202 is able to operate at, or below the stall buffer line 256 while still providing the performance output desired.

In such a manner, a gas turbine engine 200 including a system of the present disclosure may provide for improved performance over a life of the engine. Additionally, or alternatively, such a configuration may allow for utilization of a smaller core within a gas turbine engine 200, providing higher performance for a given size of gas turbine engine 200, and/or maintaining a desired acceleration margin for gas turbine engine 200 ever a life of the gas turbine engine 200.

Figure 7:
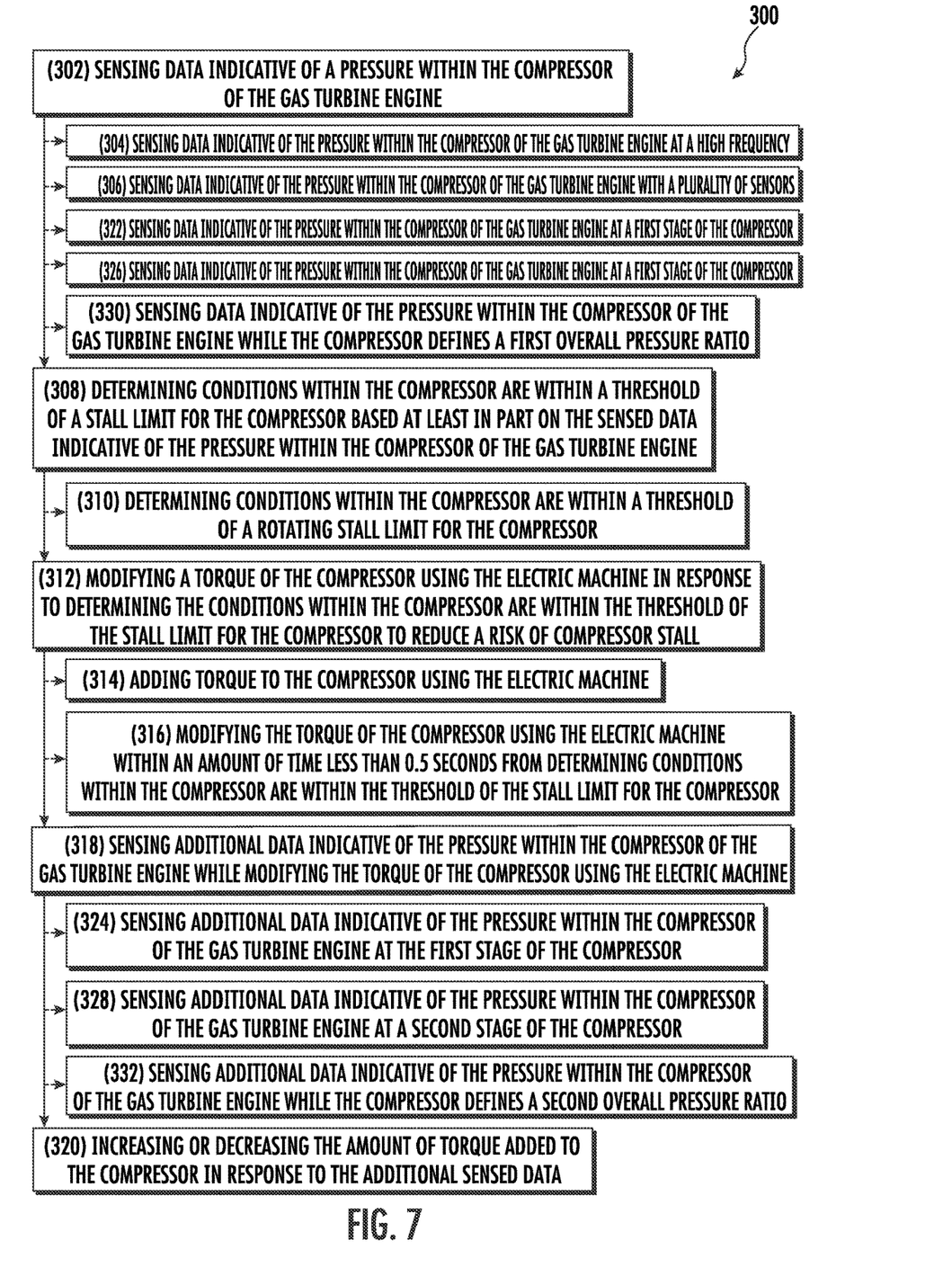
FIG. 7 is a flow diagram of a method for operating a hybrid-electric propulsion system of an aircraft.

Referring now to FIG. 7, a flow diagram of a method 300 for operating a hybrid-electric propulsion system of an aircraft is provided. The hybrid-electric propulsion system may be configured in a similar manner as one or more of the exemplary hybrid-electric propulsion systems described above with reference to FIGS. 1 through 5. For example, the hybrid-electric propulsion system may include a gas turbine engine having a compressor and an electric machine coupled to the compressor.

As is depicted, the method 300 generally includes at (302) sensing data indicative of a pressure within the compressor of the gas turbine engine. For the exemplary aspect depicted, sensing data indicative of the pressure within the compressor of the gas turbine engine at (302) includes at (304) sensing data indicative of the pressure within the compressor of the gas turbine engine at a high frequency. Further for the exemplary aspect depicted, sensing data indicative of the pressure within the compressor of the gas turbine engine at (302) includes at (306) sensing data indicative of the pressure within the compressor of the gas turbine engine with a plurality of sensors. In certain exemplary aspects, the plurality of sensors may be arranged along an axial direction of the engine, the plurality of sensors may be arranged along a circumferential direction of the engine, or both.

Referring still to FIG. 7, the method 300 additionally includes at (308) determining conditions within the compressor are within a threshold of a stall limit for the compressor based at least in part on the sensed data indicative of the pressure within the compressor of the gas turbine engine. For example, in the aspect depicted, determining conditions within the compressor are within the threshold of the stall limit for the compressor at (308) includes at (310) determining conditions within the compressor are within a threshold of a rotating stall limit for the compressor.

The method 300 additionally includes at (312) modifying a torque of the compressor using the electric machine in response to determining the conditions within the compressor are within the threshold of the stall limit for the compressor to reduce a risk of compressor stall. In certain exemplary aspects, modifying the torque of the compressor using the electric machine at (312) includes at (314) adding torque to the compressor using the electric machine. It will be appreciated that the electric machine may be used for purposes outside of the present method 300. Accordingly, for example, in modifying the torque at (312), the method 300 may increase the amount of torque being added in response to the determination at (308) if the electric machine is already adding torque to the compressor when the determination is made at (308), may reduce the amount of power being extracted from a component rotatable with the compressor in response to the determination at (308), etc.

Further, the method 300 may be configured to provide a response to the determination made at 308 relatively quickly. For example, in certain exemplary aspects, modifying the torque of the compressor using the electric machine at (312) includes at (316) modifying the torque of the compressor using the electric machine within an amount of time less than 0.5 seconds from determining conditions within the compressor are within the threshold of the stall limit for the compressor, such as an amount of time less than 0.05 seconds, such as an amount of time less than 0.001 seconds, such as an amount of time less than 0.0005 seconds.

Notably, the method 300 may be operated as a closed loop control method. For example, referring still to FIG. 7, the exemplary aspect of the method 300 depicted additionally includes at (318) sensing additional data indicative of the pressure within the compressor of the gas turbine engine while modifying the torque of the compressor using the electric machine; and at (320) increasing or decreasing the amount of torque added to the compressor in response to the additional sensed data.

In certain exemplary aspects, sensing data indicative of the pressure within the compressor of the gas turbine engine at (302) may include at (322) sensing data indicative of the pressure within the compressor of the gas turbine engine at a first stage of the compressor, and wherein sensing additional data indicative of the pressure within the compressor of the gas turbine engine at (318) may include at (324) sensing additional data indicative of the pressure within the compressor of the gas turbine engine at the first stage of the compressor.

Additionally, or alternatively, in other exemplary aspects, sensing data indicative of the pressure within the compressor of the gas turbine engine at (302) may include at (326) sensing data indicative of the pressure within the compressor of the gas turbine engine at a first stage of the compressor, and sensing additional data indicative of the pressure within the compressor of the gas turbine engine at (218) may include at (328) sensing additional data indicative of the pressure within the compressor of the gas turbine engine at a second stage of the compressor.

In such an exemplary aspect, it will be appreciated that sensing data indicative of the pressure within the compressor of the gas turbine engine at (302) may include at (330) sensing data indicative of the pressure within the compressor of the gas turbine engine while the compressor defines a first overall pressure ratio, and sensing additional data indicative of the pressure within the compressor of the gas turbine engine at (318) may include at (332) sensing additional data indicative of the pressure within the compressor of the gas turbine engine while the compressor defines a second overall pressure ratio.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A method for operating a hybrid-electric propulsion system of an aircraft, the hybrid-electric propulsion system comprising a gas turbine engine having a compressor and an electric machine coupled to the compressor, the method comprising: sensing data indicative of a pressure within the compressor of the gas turbine engine; determining conditions within the compressor are within a threshold of a stall limit for the compressor based at least in part on the sensed data indicative of the pressure within the compressor of the gas turbine engine; and modifying a torque of the compressor using the electric machine in response to determining the conditions within the compressor are within the threshold of the stall limit for the compressor to reduce a risk of compressor stall.

The method of one or more of these clauses, wherein determining conditions within the compressor are within the threshold of the stall limit for the compressor includes determining conditions within the compressor are within a threshold of a rotating stall limit for the compressor.

The method of one or more of these clauses, wherein modifying the torque of the compressor using the electric machine comprises adding torque to the compressor using the electric machine.

The method of one or more of these clauses, wherein sensing data indicative of the pressure within the compressor of the gas turbine engine comprises sensing data indicative of the pressure within the compressor of the gas turbine engine at a high frequency.

The method of one or more of these clauses, wherein modifying the torque of the compressor using the electric machine comprises modifying the torque of the compressor using the electric machine within an amount of time less than 0.5 seconds from determining conditions within the compressor are within the threshold of the stall limit for the compressor.

The method of one or more of these clauses, further comprising sensing additional data indicative of the pressure within the compressor of the gas turbine engine while modifying the torque of the compressor using the electric machine; and increasing or decreasing the amount of torque added to the compressor in response to the additional sensed data.

The method of one or more of these clauses, wherein sensing data indicative of the pressure within the compressor of the gas turbine engine comprises sensing data indicative of the pressure within the compressor of the gas turbine engine at a first stage of the compressor, and wherein sensing additional data indicative of the pressure within the compressor of the gas turbine engine comprises sensing additional data indicative of the pressure within the compressor of the gas turbine engine at the first stage of the compressor.

The method of one or more of these clauses, wherein sensing data indicative of the pressure within the compressor of the gas turbine engine comprises sensing data indicative of the pressure within the compressor of the gas turbine engine at a first stage of the compressor, and wherein sensing additional data indicative of the pressure within the compressor of the gas turbine engine comprises sensing additional data indicative of the pressure within the compressor of the gas turbine engine at a second stage of the compressor.

The method of one or more of these clauses, wherein sensing data indicative of the pressure within the compressor of the gas turbine engine comprises sensing data indicative of the pressure within the compressor of the gas turbine engine while the compressor defines a first overall pressure ratio, and wherein sensing additional data indicative of the pressure within the compressor of the gas turbine engine comprises sensing additional data indicative of the pressure within the compressor of the gas turbine engine while the compressor defines a second overall pressure ratio.

The method of one or more of these clauses, wherein the compressor is a high pressure compressor, and wherein the electric machine is drivingly coupled to the high pressure compressor.

The method of one or more of these clauses, wherein sensing data indicative of the pressure within the compressor of the gas turbine engine comprises sensing data indicative of the pressure within the compressor of the gas turbine engine with a plurality of sensors.

The method of one or more of these clauses, wherein the plurality of sensors are arranged along an axial direction of the engine.

The method of one or more of these clauses, wherein the plurality of sensors are arranged along a circumferential direction of the engine.

A hybrid-electric propulsion system of an aircraft, the hybrid-electric propulsion system comprising: a gas turbine engine having a compressor, an electric machine coupled to the compressor, and a controller, the controller including memory and one or more processors, the memory storing instructions that when executed by the one or more processors cause the system to perform the following: sense data indicative of a pressure within the compressor of the gas turbine engine; determine conditions within the compressor are within a threshold of a stall limit for the compressor based at least in part on the sensed data indicative of the pressure within the compressor of the gas turbine engine; and modify a torque of the compressor using the electric machine in response to determining the conditions within the compressor are within the threshold of the stall limit for the compressor to reduce a risk of compressor stall.

The system of one or more of these clauses, wherein determining conditions within the compressor are within the threshold of the stall limit for the compressor includes determining conditions within the compressor are within a threshold of a rotating stall limit for the compressor.

The system of one or more of these clauses, wherein modifying the torque of the compressor using the electric machine comprises adding torque to the compressor using the electric machine.

The system of one or more of these clauses, wherein sensing data indicative of the pressure within the compressor of the gas turbine engine comprises sensing data indicative of the pressure within the compressor of the gas turbine engine at a high frequency.

The system of one or more of these clauses, wherein modifying the torque of the compressor using the electric machine comprises modifying the torque of the compressor using the electric machine within an amount of time less than 0.5 second from determining conditions within the compressor are within the threshold of the stall limit for the compressor.

The system of one or more of these clauses, further comprising sensing additional data indicative of the pressure within the compressor of the gas turbine engine while modifying the torque of the compressor using the electric machine; and increasing or decreasing the amount of torque added to the compressor in response to the additional sensed data.

The system of one or more of these clauses, wherein the compressor is a high pressure compressor, and wherein the electric machine is drivingly coupled to the high pressure compressor.

The invention claimed is:

1. A method for operating a hybrid-electric propulsion system of an aircraft, the hybrid-electric propulsion system comprising a gas turbine engine having a compressor, an electric machine coupled to the compressor, and an engine controller, the method comprising:
sensing data indicative of pressures within the compressor of the gas turbine engine with a plurality of high-frequency sensors arranged at different axial locations of the compressor and capable of sensing data at frequencies from 500 hertz to 10 kilohertz;
monitoring the plurality of high-frequency sensors to determine a location within the compressor in which conditions are within a threshold of a stall limit for the compressor based at least in part on the sensed data indicative of the pressures within the compressor of the gas turbine engine;
selecting a torque profile that includes an amount of torque and a frequency of torque to match the location within the compressor in which conditions are within the threshold of the stall limit; and
modifying a torque of the compressor according to the selected torque profile using the electric machine in response to determining the location within the compressor to reduce a risk of compressor stall;
wherein modifying the torque of the compressor using the electric machine comprises modifying the torque of the compressor using the electric machine within an amount of time less than 0.5 seconds from determining conditions within the compressor are within the threshold of the stall limit for the compressor.

2. The method of claim 1, further comprising determining conditions within the compressor are within a threshold of a rotating stall limit for the compressor.

3. The method of claim 1, wherein modifying the torque of the compressor using the electric machine comprises adding torque to the compressor using the electric machine.

4. The method of claim 1, wherein the compressor is a high pressure compressor, and wherein the electric machine is drivingly coupled to the high pressure compressor.

5. The method of claim 1, wherein the plurality of sensors are arranged along a circumferential direction of the engine.

6. The method of claim 1, wherein modifying the torque of the compressor using the electric machine comprises modifying the torque of the compressor using the electric machine within an amount of time less than 0.1 seconds from determining conditions within the compressor are within the threshold of the stall limit for the compressor.

7. The method of claim 1, further comprising:
providing power to a power converter to power the electric machine;
converting the power with the power converter to drive the electric machine; and
determining conditions within the compressor are within the threshold of the stall limit for the compressor using the power converter.

8. The method of claim 1, wherein the monitoring step is performed at least partially using power electronics, a power converter, or both that are separate from the engine controller, wherein the power electronics, the power converter, or both define a refresh rate that is faster than a refresh rate of the engine controller.

9. The method of claim 1, further comprising sensing data indicative of pressure fluctuations, including a pattern and location of the pressure fluctuations; and
apply a torque with the electric machine to the compressor to oppose the pattern of the pressure fluctuations.

10. The method of claim 9, wherein the application of torque to the compressor varies in phase, frequency, and magnitude to lower an amplitude of the pressure fluctuations.

11. The method of claim 9, wherein the application of torque to the compressor is in a sinusoidal pattern 180 degrees out of phase with the pattern of the pressure fluctuations.

12. The method of claim 1, further comprising:
sensing a harmonic profile of pressure variation with the plurality of sensors; and modulating a radial speed of the compressor with the electric machine according to the harmonic profile.

13. A method for operating a hybrid-electric propulsion system of an aircraft, the hybrid-electric propulsion system comprising a gas turbine engine having a compressor and an electric machine coupled to the compressor, the method comprising:

sensing data indicative of pressures within the compressor of the gas turbine engine with a plurality of high-frequency sensors arranged at different axial locations of the compressor and capable of sensing data at frequencies from 500 hertz to 10 kilohertz;

monitoring the plurality of high-frequency sensors to determine a location of within the compressor in which conditions are within a threshold of a stall limit for the compressor based at least in part on the sensed data indicative of the pressures within the compressor of the gas turbine engine;

providing power to a power converter to power the electric machine;

converting the power with the power converter to drive the electric machine;

selecting a torque profile that includes an amount of torque and a frequency of torque to match the location within the compressor in which conditions are within the threshold of the stall limit; and modifying a torque of the compressor according to the selected torque profile using the electric machine in response to determining the location within the compressor to reduce a risk of rotating stall.

* * * * *